United States Patent [19]

Sherwood et al.

[11] 4,383,928

[45] May 17, 1983

[54] TREATMENT OF WATER CONTAMINATED WITH DISPERSED RESIN

[75] Inventors: Joseph C. Sherwood; Richard T. Brunbeck, both of Reading, Pa.

[73] Assignee: SCM Corporation, New York, N.Y.

[21] Appl. No.: 346,958

[22] Filed: Feb. 8, 1982

Related U.S. Application Data

[63] Continuation-in-part of Ser. No. 215,694, Dec. 12, 1980, abandoned.

[51] Int. Cl.³ .............................................. C02F 1/52
[52] U.S. Cl. ...................................... 210/724; 210/751; 210/908
[58] Field of Search ............... 210/751, 908, 909, 716, 210/724

[56] References Cited

U.S. PATENT DOCUMENTS

| | | | |
|---|---|---|---|
| 3,947,283 | 3/1976 | Uchikawa et al. | 210/751 X |
| 3,980,558 | 9/1976 | Thompson | 210/751 |
| 4,116,705 | 9/1978 | Chappell | 210/751 X |
| 4,149,968 | 4/1979 | Kupiec et al. | 210/751 X |

FOREIGN PATENT DOCUMENTS 53-100653  9/1978  Japan ..................... 210/751

*Primary Examiner*—Thomas G. Wyse
*Attorney, Agent, or Firm*—A. Joseph Gibbons; Merton H. Douthitt

[57] ABSTRACT

Dilute, aqueous waste dispersions of ionized film-forming resins are flocculated with Portland cement, and the resulting floc is allowed to consolidate for disposal. The consolidated floc is suitable for landfill or other use.

10 Claims, No Drawings

TREATMENT OF WATER CONTAMINATED WITH DISPERSED RESIN

This application is a continuation-in-part of U.S. Ser. No. 215,694, now abandoned, which was filed in the U.S. Patent and Trademark Office on Dec. 12, 1980.

This invention relates to waste disposal, and more particularly to treating water that is contaminated with a dilute suspension of film-forming resinous solids. A primary source of such wastes is from the manufacture of or use of waterborne paints and related surface coatings.

BACKGROUND OF THE INVENTION

With the increase in manufacture and use of water-based surface coatings having in stable suspension film-forming latex binders (such as those in conventional latex paints) and structurally ionic film-forming resinous binders (such as those used as interior linings of beverage cans, various coatings for metal, etc.), the problems of clarifying the aqueous phase of such wastes and of converting the dispersed resinous solids into a material that is reasonably satisfactory for landfill or other disposal have become significant.

Conventional flocculation of binder latices, typically as practiced with various polymeric and inorganic flocculants, can be done. However, such practice has been ineffective for handling, in a manner acceptable to environmental authorities, the disposal problems that arise from water containing the usually quite small particle, water-dispersible, structurally ionic coating binders.

The instant flocculation process is to be distinguished from related prior art proposals exemplified by Chappell, U.S. Pat. No. 4,116,705; Kupiec and Escher, U.S. Pat. No. 4,149,968 and by Uchikawa and Shimoda, U.S. Pat. No. 3,947,283. These can be characterized as "cementation" or "concretion" processes wherein the entire aqueous waste solidifies as a concrete-like mass having a total volume many times that of the suspended and/or dissolved waste. In essence, then, it is evident that such prior art processes convert substantially all of the water in the aqueous waste to a solid product. In contrast, the instant process provides for a distinct separation of clarified effluent on the one hand, and, on the other, waste solids in a compact and practical form.

The present process, therefore, comes as a pleasant surprise because it not only efficiently and effectively can be used to treat aqueous wastes containing either structurally ionic resins or those that are nonionic or partially so, but it also can be used to treat them in a way that can satisfy today's critical authorities concerned about both clarification of the water effluent and disposal of the solid fraction of such wastes.

BROAD STATEMENT OF THE INVENTION

One aspect of this invention is a process for treating water contaminated with a dilute, dispersion of ionized film-forming resin. It comprises gradually mixing a minor flocculating proportion of Portland cement with a major proportion of the contaminated water until said resin flocculates; and allowing the resulting cementitious floc to consolidate for disposal, the volume of the resulting consolidate being but a minor fraction of the contaminated water being treated.

The resulting floc and the resulting resin-depleted aqueous phase can be separated from each other while the floc still is fluent, and the floc, thus separated, allowed to consolidate (cure). Alternatively the resulting floc can be allowed to consolidate (cure) in the presence of said resin-depleted aqueous phase before such separation. The resulting consolidate will be referred to from time to time hereinafter as a "cured sludge" and an accumulation of still fluent floc as "slack sludge."

The cured sludge resists leaching by water. Such cured sludge can be produced in solid structural units, generally of a simple geometric shape suitable for use in building, particularly when such product contains added mineral matter or other filler such as sand, fly ash, etc. Usually, however, the cured sludge does not necessarily need to be made into regular pieces, but can be quite nondescript geometrically for disposal in a landfill. Typically wet, slack sludge shrinks appreciably upon curing in a mold (unless it contains a great deal of added filler material) and can reach in some instances a cured density in excess of 80% nonvolatile matter (by ASTM test D-2832 (1980)) upon quite perfunctory and simple curing.

DETAILED DESCRIPTION OF THE INVENTION

The dispersed binder solids to be treated here (dispersed in water without pigmentation or in dispersion of a surface coating or paint containing the usual fillers, often opacifying pigment, and other typical paint ingredients) can be of various types.

A most troublesome type to dispose of satisfactorily in accordance with environmental standards is a usually small particle size, water-dispersible, structurally anionic film-forming binder, one that (on a dry resin basis) has an Acid No. of at least about 10, generally 30 and upwards, and usually about 60 to 70 or even higher. Such anionic resinous solids often have blended with them resins that are structurally non-ionic or resins that exhibit no apreciable ionizable character (i.e., Acid No. or Base No. less than 10, rarely as much as 5, and usually zero), often contain some crosslinker, typically hexamethylol melamine resin or the like, and these anionic resins are ionized with alkaline ionizing agent, typically ammonia or an amine or olamine. Such binder, considered in all its components, can be characterized in significant part as a lyophobic colloid that probably is partially insoluble and partly in true or apparent aqueous solution, often having some of the attributes of a solute in water when the anionic portion of such resin is ionized to constitute a weak anionic polyelectrolyte.

Another type of waste to dispose of is one that contains a water-dispersible, structurally cationic film-forming binder typically having Base No. (on a dry resin basis) of at least about 10, generally 30 and higher, and usually 50 or more. Cationic resinous solids also often have blended with them resin that is structurally nonionic or resin that exhibits no appreciable ionizable character (i.e., Acid No. or Base No. less than 10, rarely as much as 5, and usually zero) and often contain some crosslinker, typically hexamethylol melamine resin or the like. Cationic amino resins usually are ionized with an acidic ionizing agent, typically lactic or acetic acid. Also cationic in nature and amenable to the instant processing are aqueous wastes containing film-forming onium resins such as quaternary ammonium resins, which have their own source of counterions for aqueous dispersion.

The structurally ionic film-forming resin can be of a kind which might be characterized as a "latex," for example, because of its particle size and appearance in water, providing it has built-in ionizable functionality. However, another type of aqueous waste that can be treated by the instant process is one wherein the resinous contaminant consists essentially of a film-forming binder that has no appreciable ionization capability, i.e., it is nonionic or at most very weakly ionic (with Acid No. or Base No. of resinous solids on dry basis being less than 10) and the pH of this waste is above 6. Such waste best is deliberately acidulated to bring its pH to at least as low as about 6 and, advantageously, even lower. Such resinous binder usually is of higher average molecular weight than the structurally ionic types of binders above discussed, and generally is termed a film-forming latex, typically having average particle size (diameter) from about 0.1 micron on up to about 10 microns and often about 0.5 micron to about 5 microns. Representative of this type of latex is a butadiene-styrene latex suitable as a binder in an aqueous latex paint. Generally such waste pH then is brought to between about 2 and about 5, and advantageously to between 4 and 5. The acidulation can be made with acetic or like protic acid, usually a monobasic acid. This prevents the resin from turning into a gummy, difficult-to-handle coagulum when treated with the cement and probably helps to destabilize such latex. While inorganic materials such as sulfuric acid and other conventional acidulants can be used for the purpose, carboxylic acid ones such as acetic have the advantage of biodegradability.

Usually these waste suspensions of structurally ionic resinous film-forming binder solids and/or latices result from washing down tanks, vessels, waste drains and the like in plants where paints or other surface coatings made with them are manufactured or where such paints or other surface coatings are used in the coating of objects. A typical such waste will have about 1 (and sometimes less) to at most about 10% and more likely about 2 to 5% by weight of total nonvolatile solid matter including the resin; this is the raw water waste for treatment. Where the consolidate resulting from the instant processing is desired, say, for structural use, to be even more highly filled with mineral and like solids than would normally result from a paint waste containing, say, titanium dioxide pigment, clay, talc, mica and/or other fillers, one, of course, can add particulate silica, clay, grog, glass, etc., to the waste preparatory to flocculation or after flocculation, but before the floc has so consolidated that incorporation of such solids is impractical or expensive.

The Portland cement flocculating agent for this process can be any common type of such cement, the finer the grind, the generally better in terms of its activity for the instant purposes. Desirably it has a Blaine No. of at least about 3,000 sq.cm./gm. The cement need not have good white color, but can be an ordinary grayish sort.

In the simplest embodiments of this invention, the phases are separated by settlement and decantation. Accelerated gravity separations such as centrifuging also can be used, and filtration of solids from liquids is possible, but generally not necessary or particularly economic here. Typically the waste water containing the paint solids is agitated mildly at room temperature, typically 60°-85° F. or even higher in summer, and the cement is added to the agitated water gradually (continuously or in increments) until the resinous solids ostensibly flocculate into agglomerates. This addition takes generally from about 5 to about 20 minutes for treating 100 gallons of contaminated water. Advantageously, a proportion of about 1 to 8, and preferably about 2 to 4 pounds of cement per pound of resinous solids present beng treated is used. The agitation then is stopped to permit the formation of clarified effluent supernatant to a wet, slack sludge layer in the bottom of the tank. The flocculation and settlement can be done in as short as 15 to 20 minutes, but usually is given 1 to 2 hours for better clarification, and can be considered done when the supernatant effluent layer is clear enough to further treat by other processing or to dispose of.

In one embodiment, the clarified effluent can be decanted off, and the still fluent, highly aqueous slack sludge dumped into a container such as a shallow rectangular form for curing. Simple tankage is adequate with agitating and draining means for the water, slurry, and slack sludge. In this embodiment, because the slack sludge will cure, even under water, it should be dumped or drained away when still quite fluent. Alternatively, the floc can be allowed to consolidate in the presence of supernatant, resin-depleted aqueous phase, that phase decanted away, and the resulting consolidate dumped as a chunk into a disposal bin.

While it is not normally necessary to wash, rinse, or repulp the sludge before or after its curing, it should be realized that in certain demanding situations such treatment with water or an aqueous washing solution (e.g., slightly acidic) could be desirable to remove in a controlled way impurities that might tend to leach out of the cured sludge later.

In a matter of usually about 2½ to 24 hours a wet, precipitated unconsolidated floc (slack sludge) cures into an ostensibly solid mass, generally with considerable shrinkage. Such mass is distinct from an aqueous serum which separates from the curing slack sludge that has been separated from resin-depleted aqueous phase. Said serum can be drained away; if desired, it can be treated with an oxidant such as chlorine to destroy objectionable amine traces, if they are present, or subjected to further purifying treatment with microorganisms, such as activated sludge sewage treatment, or ion exchange.

When a slack sludge is sufficiently cured by the action of time, typically in a day or less, it can be removed from its container and discarded into landfill as a solid piece. Mild heating can accelerate cure, but is not needed. The solid piece typically will have in excess of 65% solids and will occlude some moisture, but it has been found to be unobjectionable as to leaching too much and thereby violating environmental standards as an item of landfill. Because of the binding action of the resinous material, it is, of course, possible to form the cured sludge into a structural solid piece such as a block using an appropriate mold and, if desired, additional filler material.

The steps of process are most simply operated batchwise, but parts or all of them can be made to operate practically continuously where the volume of waste to be disposed of renders such operation practical. An adequate material for most of the equipment construction is steel, although, for prolonged or rigorous use, acid-resisting materials such as austenitic stainless steels, stoneware, and the like can be more serviceable.

The following examples show ways in which the invention has been practiced, but should not be construed as limiting the invention. In this specification all parts are parts by weight, all percentages are weight percentages, and all temperatures are in degrees Fahrenheit unless otherwise expressly noted.

EXAMPLE 1

First experiments were conducted in laboratory glassware. The dilute aqueous waste suspension of water-dispersible film-forming binder treated was from the manufacture of a water-dispersible interior beverage can liner, an aqueous dispersion which had been resistant to viable treatment with conventional flocculating agents. The actual aqueous waste from such manufacture contained about 2 to 4% by weight of that binder; it was a resinous mixture having Acid No. of about 85 (on a 100% solids basis). The resin itself was a mixture of: (a) epoxy resin; (b) a graft resin having an epoxy resin backbone onto which had been grafted copolymer appendages of methacrylic acid, styrene and a little ethyl acrylate; and (c) ungrafted copolymers of those three monomeric units. This resinous mixture had been made and partially neutralized with dimethylethanolamine substantially in accordance with Example 11 of U.S. Pat. No. 4,212,781, the disclosure of which is incorporated expressly herein by reference. The cement used was Allentown Brand Portland cement, Type 1, having Blaine No. of about 3,200 sq. cm./gm.

The treating tank was simply a glass flask. It had a mechanical agitator and held a 16-ounce charge of the aqueous waste. Into such waste was sifted 1 to 3 ounces of the cement in a period of 5 to 10 minutes; flocculation took place.

Agitation was stopped and there settled in about 1 to 5 minutes a highly aqueous slack sludge over which was a supernatant clear water effluent. This effluent was decanted off. The slack sludge was dumped into a shallow container and allowed to sit for 24 hours. The sludge cured to an ostensibly solid mass substantially surrounded by and lying underneath a clear aqueous serum (which could be further treated with an oxidant if desired). The cured sludge piece was removed from its container; it appeared to be quite leach-resistant, thus suitable for use as landfill.

EXAMPLE 2

The same kind of aqueous waste was processed in a 55-gallon drum in essentially the procedure of Example 1, but using 40 gallons of waste and 20 to 30 pounds of cement. Floc formation took 15 to 20 minutes. Clear effluent was decanted off the resulting settled floc (slack sludge). The slack sludge was poured out into a frame and allowed to stand, and thus cure, for 24 hours. This caused a clear aqueous serum to collect around and above the cured sludge. The thus-consolidated (cured) sludge was suitable for landfill. Blocks of same probably would be unsuitable for architectural purposes because of shrinkage distortion, although, if filled more completely with sand or the like before final curing, they could have been a useful structural block product for many purposes.

Alternatively the aqueous waste like that of Example 1 can be processed in the following manner. A 55-gallon tank having a round bottom and frustroconical walls widening toward the top can be used instead of the drum of Example 2. Here, the volume of the waste is flocculated as in Example 2, and the resulting fluent sludge is allowed to stand and consolidate for 24 hours beneath the resulting supernatant clarified water phase. Such water phase is then drained off. The consolidated sludge then is dumped as a chunk into a disposal bin.

EXAMPLE 3

The waste here contained about 3% aqueous film-forming latex solids; a copolymer of predominantly vinyl acetate with 2-ethylhexyl acrylate, said polymer having no appreciable structurally ionizing capability. This waste also contained pigmentary titanium dioxide and mineral filler particles and, in fact, was the aqueous waste from preparing and canning a latex paint.

A sample of such waste was acidulated with acetic acid to pH 4.5, then the same kind of Portland cement as used in Example 1 was mixed in until flocculation occurred using about 2.5 parts of the cement per part of latex present in the sample. The resulting floc was settled, the supernatant liquid decanted therefrom, and the settled floc poured off as a slack sludge. After aging such sludge for 24 hours in a shallow form, an aqueous serum collected. It was separated from the thus-cured sludge, which remained in the form of a cohesive, leach-resistant mass.

However, when this experiment was performed without any acidulation, the addition of the Portland cement gave a gummy, gooey mass which was extremely difficult to handle and generally unsuitable.

The Department of Environmental Resources of the State of Pennsylvania permitted disposal to conventional approved landfill of sludges like those made in accordance with the methods of Examples 2 and 3.

An independent laboratory also tested the cured sludge of Example 2 to determine its resistance to leaching in a landfill. The leachate obtained was one prepared according to the EPA leaching method described in "Test Methods for Evaluating Solid Waste, Physical/Chemical Methods" published May, 1980, by the U.S. Environmental Protection Agency. The procedure was as follows:

150 grams of said cured sludge were placed in 2,400 ml. of high purity water, and the water was stirred for 24 hours. At this point pH was 11.0. It required 252 ml. of 0.5 N acetic acid to obtain and maintain pH of 5 in the resulting water. The slurry was filtered, the filtrate diluted to 3,000 ml., and it was analyzed as follows:

| | |
|---|---|
| *Conductivity, micromho/cm. | 2770 |
| *pH | 5.7 |
| *Chemical Oxygen Demand, mg COD/liter | 4456 |
| *Total Volatile Solids, mg/liter | 1237 |
| *Total Dissolved Solids, mg/liter | 3056 |
| *Solvent Extractables, mg/liter | 29.0 |
| *Total Organic Carbon | 1970 |
| Ammonia Nitrogen, mg $NH_3$.N/liter | 1.40 |
| Phenolics, mg $C_6H_5OH$/liter | 525 |
| Cyanides, mg Cn/liter | 0.021 |

| | Actual Value | MCL** |
|---|---|---|
| Arsenic, mg AS/liter | less than 0.002 | 5.0 |
| Cadmium, mg Cd/liter | 0.068 | 1.0 |
| Chromium, mg Cr/liter | 0.033 | 5.0 |
| Copper, mg Cu/liter | 0.027 | |
| Lead, mg Pb/liter | less than 0.040 | 5.0 |
| Mercury, micrograms Hg/liter | less than 0.50 | 200 |
| Molybdenum, mg Mo/liter | less than 0.050 | |
| Nickel, mg Ni/liter | 0.030 | |
| Selenium, mg Se/liter | less than 0.002 | 1.0 |
| Silver, mg Ag/liter | 0.008 | 5.0 |

*These values may include a contribution from the constituents of the leaching solution as well as the solution's reaction with the waste.
**Maximum contaminant levels allowed by the United States EPA for hazardous wastes.

From the foregoing it can be seen that the leachate contained substantially less contamination than is permitted by RCRA Standards as specified by the U.S. Environmental Protection Agency.

Further similar testing was performed on various acidically-reacting aqueous wastes from the preparation of resins such as oil-extended alkyd resins, unsaturated polyesters, and the process was found effective for them to yield cured sludge and clarified aqueous effluent.

It was found that Portland cement having higher surface area, i.e. a higher Blaine No. (of between 5,000 and 6,000 sq. cm./gm.), was more effective per unit weight for the instant purposes than was the ordinary cement with a Blaine No. of about 3,200 when perfunctory agitation was being used; however, when a saw-toothed mixing blade was used on the agitator and the mixing intensity increased somewhat, the use of the ordinary coarser Portland cement gave improved unit weight efficiency tending to approach that of the finer cement.

EXAMPLE 4

Using the ordinary surface area cement of Example 1 and a saw-toothed mixing blade agitator, medium intensity mixing, various waste samples were tested. In one run the waste was an aqueous dispersion like that treated in Example 1, except that it had 5.8% resin solids content. 1.46 parts of cement per part of resin were added, the cement addition being done in 20 minutes. Settling was permitted for a couple of hours, the supernatant water effluent decanted, then the slack sludge dumped into a shallow container and allowed to cure overnight at room temperature (about 72° F.). The decanted water had 0.12% by weight total solids in it (measured by evaporation of the sample). The solids content (NVM) of the resulting cured sludge was 73.1%.

EXAMPLE 5

In a further test run, the aqueous waste contained a vinyl and acrylic copolymer having tertiary amino functionality ionized with acid for dispersion. The resin solids concentration was 4.3%; pH of the waste dispersion was lowered to 4.5 with addition of acetic acid. The equipment and treatment was like that of Example 4. Portland cement like that of Example 1 was added in 15 minutes in a proportion of 1.8 pounds of cement per pound of resin present. Resulting sludge and decanted water were handled the same way as in Example 4, the water having 0.15% solids content remaining upon evaporation, the cured sludge having 69.9% solids content (NVM).

EXAMPLE 6

Flocculation was performed with cement on same sort of aqueous waste as used in Example 5, except that the resin concentration thereof was about 3%. Initial pH of this waste was below, but approaching 6. It was unaltered by deliberate acidulation, the addition of acetic acid having been dispensed with. The cement addition was made like that in Example 4, using the same kind of cement. Approximately 0.4 pound of such cement was used per gallon of the waste. Upon settling and consolidating, the resulting sludge amounted to about 20% of the volume of the original waste, and the clarified water thereabove about 80%.

EXAMPLE 7

To distinguish the instant process from that disclosed and claimed in U.S. Pat. No. 4,116,705 issued to Christopher Lee Chappell on Sept. 26, 1978, direct comparison tests were performed. The same starting aqueous waste was used in both tests. It was a suspension of water-dispersible film-forming coating composition binder obtained from water washing residue from a 4,000-gallon tank that had held an aqueous coating dispersion of film-forming styrene/anionic acrylic copolymer blended with a melamine resin crosslinker and ionized for dispersion with triisopropanolamine. Such aqueous waste had total solids content of 2-5 percent and contained titanium dioxide and inert pigments.

In the first such experiment, using moderate stirring, 30 grams of Allentown brand Portland cement were mixed into 500 ml. of the above-described aqueous waste suspension over a two-minute period. Then the stirring was stopped, and the resin allowed to settle to the bottom of beaker as a floc having a volume of about 150 ml. The top layer was a clear liquid (350 ml. volume) which was easily decanted from the precipitated floc. The precipitated floc occupied a final volume of only 3/10 that of the original volume of the starting waste suspension used whereas the decanted liquid occupied a volume of 7/10 that of the original volume. In this experiment, the usage of cement was 0.60 pound of cement per gallon of treated aqueous waste.

In the second such experiment, a sample of the same starting waste suspension was treated according to the Chappell process exemplified in Example 1 of U.S. Pat. No. 4,116,705 using ingredients and proportions as specified therein. To 108 ml. of initially moderately-stirred waste suspension were added gradually 200 grams dry aluminum silicate powder plus 40 grams of Allentown Portland cement. Mixing became labored and there was not enough of the waste suspension to soak all of the dry treating agents specified in such Example. Following the mixing, the original volume of 108 ml. aqueous waste had increased markedly. The process yielded ultimately a mass occupying a total volume of 600 ml. This mass resembled a water-deficient, powdery but somewhat cohesive concrete of low strength.

The direct comparison of the instant flocculation process with the concretion process of Chappell can be summarized as follows:

| | Chappell U.S. Pat. No. 4,116,705 | Present Process |
|---|---|---|
| Starting Waste Volume | 108 ml. | 500 ml. |
| Final Volume | 600 ml. | 150 ml. |
| Cement (lbs./gallon) | 3.71 | 0.60 |
| Aluminum Silicate (lbs./gallon) | 18.56 | None |
| Decanted Recovered Clarified Water | None | 350 ml. |

These results clearly distinguish between the two kinds of processing. A major advantage of the instant invention over U.S. Pat. No. 4,116,705 (Chappell) is evident, namely the obtention of a major volume of clarified supernatant aqueous portion (and its potential for disposal or reuse) and only a very minor volume of consolidated matter for disposal, e.g., as landfill. Other economies, in cement and work, also were demonstrated.

What is claimed is:

1. A process for treating water contaminated with a dilute dispersion of ionized film-forming resin which comprises:

gradually mixing a minor flocculating proportion of Portland cement with a major proportion of said contaminated water until the resin flocculates; and allowing the resulting cementitious floc to consolidate for disposal, the volume of the resulting consolidate being a minor fraction of the contaminated water being treated.

2. The process of claim 1 wherein the resulting resin-depleted aqueous phase and resulting floc are separated while the floc still is fluent, and said separated fluent floc is allowed to consolidate.

3. The process of claim 1 wherein the floc is allowed to consolidate in the presence of supernatant resin-depleted aqueous phase prior to separation therefrom.

4. The process of claim 1 wherein the Blaine No. of the cement is at least about 3,000 sq. cm./gm.

5. The process of claim 1 wherein the resinous solids content of said contaminated water is not substantially in excess of about 10 weight percent, and the proportion of said cement used is between about ⅛ and about 9/10 pound per gallon of said contaminated water.

6. The process of claim 1 wherein said contaminating resin has Acid No. of at least about 10 and it comprises at least partially ionized, water-dispersible, structurally anionic polyelectrolyte resin.

7. The process of claim 1 wherein said contaminated water contains film-forming resin having no appreciable ionizing capability in place of or admixed with said ionized film-forming resin, said water has pH above 6, and the pH of said water is brought by acidulation to at least as low as 6 prior to mixing of the cement therewith.

8. The process of claim 1 wherein said contaminating resin comprises at least partially ionized, water-dispersible, structurally cationic polyelectrolyte resin.

9. A structural unit comprising consolidated floc of claim 1.

10. The structural unit of claim 9 which is of a simple geometric shape.

* * * * *